June 18, 1968  H. G. BERNAUX  3,388,751
TORQUE CONTROL AND MEASURING DEVICE
Filed Jan. 26, 1966  2 Sheets-Sheet 2
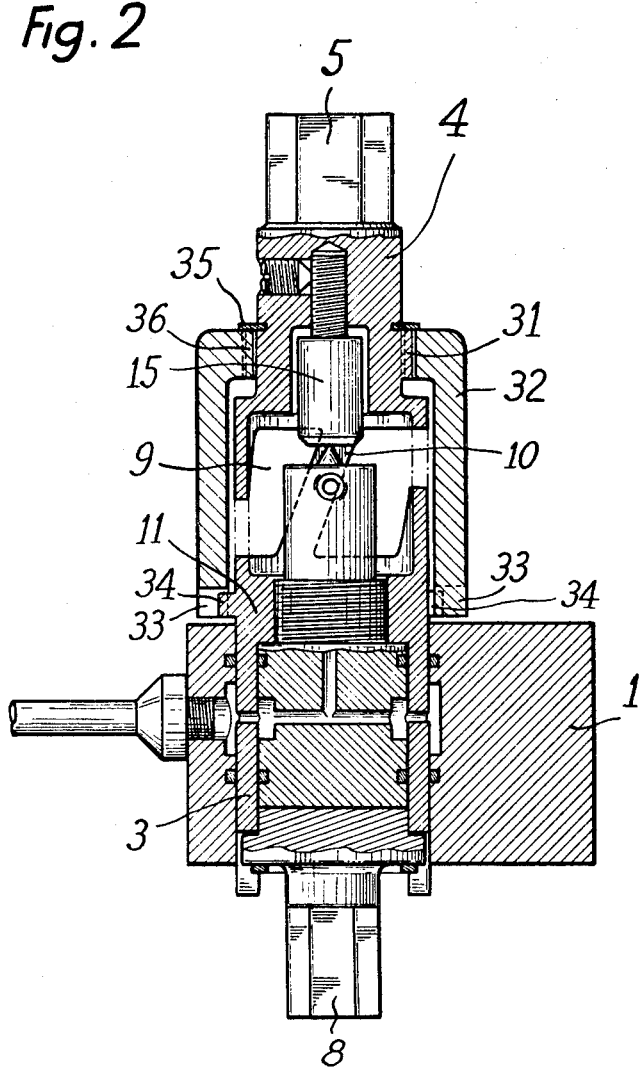

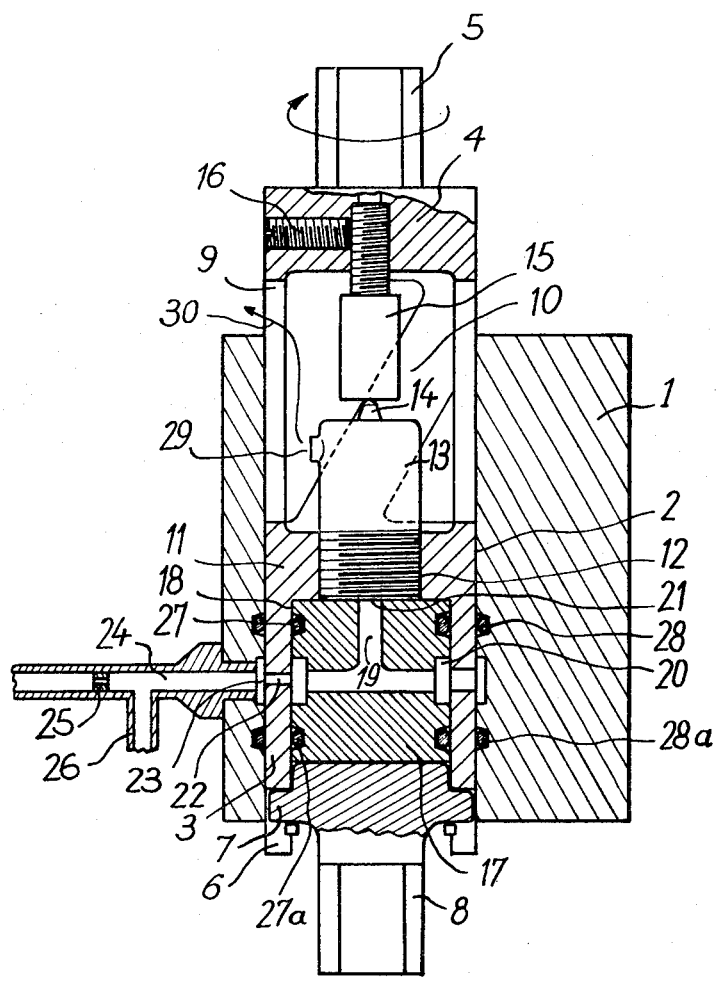

United States Patent Office 3,388,751
Patented June 18, 1968

3,388,751
TORQUE CONTROL AND MEASURING DEVICE
Henri G. Bernaux, Maule, France, assignor to Societe Anonyme dite: Societe des Automobiles SIMCA, Paris, France
Filed Jan. 26, 1966, Ser. No. 523,173
Claims priority, application France, Jan. 28, 1965, 3,516; Dec. 16, 1965, 42,636
10 Claims. (Cl. 173—12)

ABSTRACT OF THE DISCLOSURE

A torque control and measuring device for a screw-tightening machine comprising, a driven member connected to a driving member by the intermediary of a movement transmission member which comprises a tubular spindle having an apertured wall. Adjacent sides of the aperture define deformable blades which connect two non-deformable end portions of the spindle and which move towards and away from one another when the blades are deformed under the action of a torque. One of the end portions acts on a pressure sensitive member to thereby measure the torque applied to the device.

---

The present invention has for an object a torque control and measuring device for a machine tool and in particular for a screw-tightening machine.

Torque measuring devices used up to the present time with screw-tightening machines are not precise enough and they necessitate an individual control of each screw or nut, effected by means of a dynamometric wrench in order to obtain precise torques. This operation is long, tedious and tiring, and its control is moreover dependent, in manufacture, upon the use of the wrench by the operators and upon the type of wrench.

It is an object of the invention to provide a torque control and measuring device for a tightening machine which enables precise dynamic or static torque measurements to be made on a member such as a screw or nut during screwing thereof, such measurements being made in the screwing axis. Other objects and advantages will become apparent in the description which follows.

The action of the applied torque on a deformable tubular spindle causes two non-deformable end portions of the spindle to move towards or away from one another. Such end portions being situated on either side of flexible blades, the movement of these portions being measured by a pressure sensitive member in combination with a pneumatic, electrical or hydraulic indicating member which transmits the amplified information to pneumatic, electrical or hydraulic control apparatus. The information which is thus obtained permits the driving motor speed to be controlled from the measured torque. The torque measuring control device according to the invention enables the abovementioned disadvantages and the individual control of each screw or nut by means of a dynamometric wrench to be substantially eliminated, whilst a precise torque load on the member being screwed can be obtained, thus reducing the screwing time.

With this device, an increase in the precision of the torque load is obtained, which, in the assembly, is no longer dependent upon the precision of the motor but upon the elastic deformation of the blades of the tubular spindle which is very precise, and this can result also in prolonging the life of the motors.

The work can be checked independently of operators and it is possible to prevent or suppress a cycle if the desired conditions are not fulfilled.

The control device is of reduced overall dimensions and may be incorporated with upright or off-set motors without limiting the use thereof. The device is also easily adaptable to existing motors depending upon the precision required and upon the demand.

Finally, there is the possibility of checking the torque variations by observation and recording during actual operation.

The deformable blades are preferably inclined. Other characteristics and advantages of the present invention will appear from the following description of an embodiment given solely by way of example, this description being given with reference to the accompanying drawing in which:

FIGURE 1 is a view in axial section of the torque control and measuring device according to the invention, mounted on a screw-tightening machine, and FIGURE 2 is a view in longitudinal section of the device having a pre-stressing ring.

Referring to the drawings, FIGURE 1 shows the body 1 of a screw-tightening machine which is fixed and which has a bore 2, in which is rotatably mounted a tubular spindle 3, closed at one of its ends 4 and which has a drive sleeve 5 connected with a driving member (not shown in the drawing) and constituted by the motor of the screw-tightening machine.

At its other end, the tubular spindle 3 has recesses 6 in which are engaged drive pins 7 of a drive member 8, connected to the socket of the screw-tightening machine (not shown in the drawing) which acts on the screw or nut.

The tubular spindle 3 is thus utilised as a transmission member between the driving member 5 and the driven member 8.

The tubular spindle 3 has apertures 9 formed therein between its ends, adjacent sides of the apertures defining deformable blades 10 which are shown sloping in the drawing but which may alternatively be upright. These deformable blades 10 connect two non-deformable portions 4 and 11 of the tubular spindle, which move towards one another when a torque is applied between the members 5 and 8 causing deformation of the blades 10.

In the portion 11 of the spindle 3 which is threaded at 12, is screwed a follower 13 of known type whose control tip 14 is in abutment against an adjustable button 15 which is screwed into the portion 4 of the spindle 3 and locked in position by a set-screw 16. Beneath the follower 13 is disposed a stopper 17 which is engaged in a space 18 of the spindle 3. This stopper 17 has a conduit 19 which is connected on the one hand with one of the apertures 21 of the follower 13 and on the other hand with a groove 20 made on the periphery of the stopper 17 which opens out through conduits 22 formed in the wall of the spindle 3, into a groove 23 in the body of the screw-tightening machine 1.

In the body of the machine 1 is screwed a conduit 24 opening out on the one hand into the groove 23 and supplied on the other hand through a calibrated aperture 25 with compressed air from a suitable source (not shown in the drawing).

To this conduit 24 is connected a conduit 26 connected in particular to a pressure-indicating member (not shown in the drawing).

Sealing joints 27, 27a situated on either side of the groove 20 are disposed between the stopper 17 and the spindle 3; sealing joints 28, 28a situated on either side of the groove 23 are arranged between the spindle 3 and the body of the screw-tightening machine 1.

The operation of the torque control and measuring device is as follows.

When a torque is applied between the members 5, 8 it causes the portions 4 and 11 of the spindle 3 to move towards each other, the tip 14 of the follower 13 is compressed under the action of the button 15, thus permitting it to open a valve (not shown) and allow a certain amount of compressed air to escape through its aperture 29 and the openings 9 in the direction of the arrow 30, the compressed air coming from the supply conduit 24 and the conduits 22, 19 connected by the grooves 23, 20.

The pressure in the conduit 24 thus diminishes in proportion to the opening of the follower 13 which is a function of the displacement of the portions 4 and 11 of the spindle 3 and of the torque applied between the members 5 and 8.

On the pressure-indicating member connected to the conduit 26, there may be read a variation of pressure which is proportional to the torque to the measured, said pressure member being calibrated directly in torque-measuring units.

In the embodiment shown and described above, a member sensitive to pressure is used which is constituted by a follower 13 used in combination with a compressed air circuit, but it would also be possible to obtain the same result with another member sensitive to pressure which would be used in combination with an electrical or hydraulic circuit controlling an indicating member giving information concerning the torque to be measured.

This device may present different uses for the unitary or multiple tightening of screws or nuts.

An indication of the minimum torque without stopping of the drive motor is determined by the closing of a circuit (pneumatic or electrical) on a differential press-contact which turns a lamp on or off when the minimum torque is obtained. If, for any reason, the minimum torque decreases, the information disappears and when the predetermined torque is again obtained, the information is again visible.

When the required torque is obtained, the stopping of the drive motor is determined by the interlocking of a relay (electrical, pneumatic or hydraulic) which causes the stopping of the supply of motive energy. The supply remains cut off until the relay is triggered.

One may also obtain the feedback of a motor for a predetermined torque, by connecting the control circuit (electrical, pneumatic or hydraulic) in the manner of a Wheatstone bridge, this permitting a variation of the motive energy controlled by the torque up to the required value.

Finally, a sequential application may be obtained of the torque on a member, by using the above connections and by connecting together a plurality of devices. When the required conditions are obtained on a first motor, the second motor can be started and so on in a predetermined order. This application corresponds in particular to the tightening of the screws on the cylinder heads of an internal combustion engine.

According to the embodiment of FIGURE 2, the possibility of pre-stressing the deformable part of the transmission member is utilised.

This pre-stressing permits the control range to be reduced and the torque values higher than this pre-stress to be read or triggered with greater accuracy.

On the other hand, the pre-stress also permits any effect of oscillation to be eliminated for the torques lower than the value of the torque corresponding to the pre-stress.

In the torque control and measuring device shown in FIGURE 2, the non-deformable part 4 of the tubular spindle carries involute splines 31 on which are engaged corresponding grooves 36 of a pre-stressing ring 32 disposed around the tubular spindle 3.

At the end opposite the involute splines, the prestressing ring 32 has slots 33 in which are engaged corresponding projections 34 formed on the non-deformable part 11 of the tubular spindle 3.

The ring 32 is held by a split elastic ring 35 engaged in a groove of the spindle 3.

The pre-stressing of the deformable blades 10 is obtained on a balanced torque applying assembly which permits a torque slightly greater than the pre-stress to be applied between the non-deformable parts 4 and 11, in order to permit the ring 32 to be placed in position in the involute splines 31, and permits the slots 33 of the ring to be engaged with the projections 34 of the part 11 of the spindle.

The involute splines 31 are formed on the tubular spindle 3 in a position angularly offset with respect to the projections 34, in the same manner as the involute grooves of the ring 32 which are formed angularly offset with respect to the slots 33.

It is sufficient to use a plurality of rings 32 comprising different angular settings between the splines 36 and the slots 33 for effecting the necessary different pre-stresses.

I claim:

1. A torque control and measuring device for use with a screw-tightening machine, comprising: a driving member, a driven member, and a movement transmission member; said movement transmission member being fixedly connected to said driving and driven members and comprising a tubular spindle having two non-deformable end portions with a wall portion formed therebetween, a plurality of deformable blades connecting the two end portions; said blades being formed between apertures formed in said wall portion, said two end portions being capable of relative movement with respect to each other along the axis of said spindle when the blades are deformed under the action of an applied torque; a pressure sensitive member coacting with one of said end portions to thereby measure the torque applied to the device.

2. The device according to claim 1 wherein the pressure sensitive member comprises a follower fixed to one of said end portions; an adjustable button on said other end portion and abutting said follower; a compressed air circuit having a calibrated aperture whose evacuation and admission are controlled by the coaction of said follower with the adjustable button, and means adapted to be operated by compressed air to control the torque applied by the screw-tightening machine to a member to be tightened.

3. The device according to claim 1 wherein the pressure sensitive member comprises a follower fixed to one of said end portions, an adjustable button on said other end portion abutting said follower; a compressed air circuit having a calibrated aperture whose evacuation and admission are controlled by the coaction of said follower with the adjustable button; and indicating means adapted to be operated by compressed air to indicate the torque applied by the screw-tightening machine to a member to be tightened.

4. The device according to claim 1 further comprising an electrical circuit in combination with said pressure-sensitive member to control the torque applied by the screw-tightening machine to a member to be tightened.

5. The device according to claim 1 further comprising an electrical circuit and indicating means, said electrical circuit in combination with said pressure-sensitive member operating said indicating means to indicate the torque applied by the screw-tightening machine to a member to be tightened.

6. The device according to claim 1 further comprising a hydraulic circuit in combination with said pressure-sensitive member to control the torque applied by the screw-tightening machine to a member to be tightened.

7. The device according to claim 1 further comprising indicating means, a hydraulic circuit in combination with said pressure-sensitive member to operate said indicating means to indicate the torque applied by the screw-tightening machine to a member to be tightened.

8. The device according to claim 1 wherein a pre-stressing ring is mounted around the transmission member, said ring being secured to the end portions of the transmission member to subject said transmission member to a pre-stress.

9. The device according to claim 8 wherein one of said end portions includes an involute spline and said pre-stressing ring includes a corresponding groove within which said spline is engaged.

10. The device according to claim 8 wherein projections are formed on one of said end portions and said pre-stressing ring includes slots within which said projections are engaged.

References Cited
UNITED STATES PATENTS

| | | | |
|---|---|---|---|
| 2,250,736 | 7/1941 | Torresgn | 81—52.4 |
| 2,973,067 | 2/1961 | Eddy | 173—12 |
| 3,131,554 | 5/1964 | Hornschuch et al. | 173—93 |
| 3,174,606 | 4/1965 | Hornschuch et al. | 173—12 |

ERNEST R. PURSER, *Primary Examiner.*